UNITED STATES PATENT OFFICE.

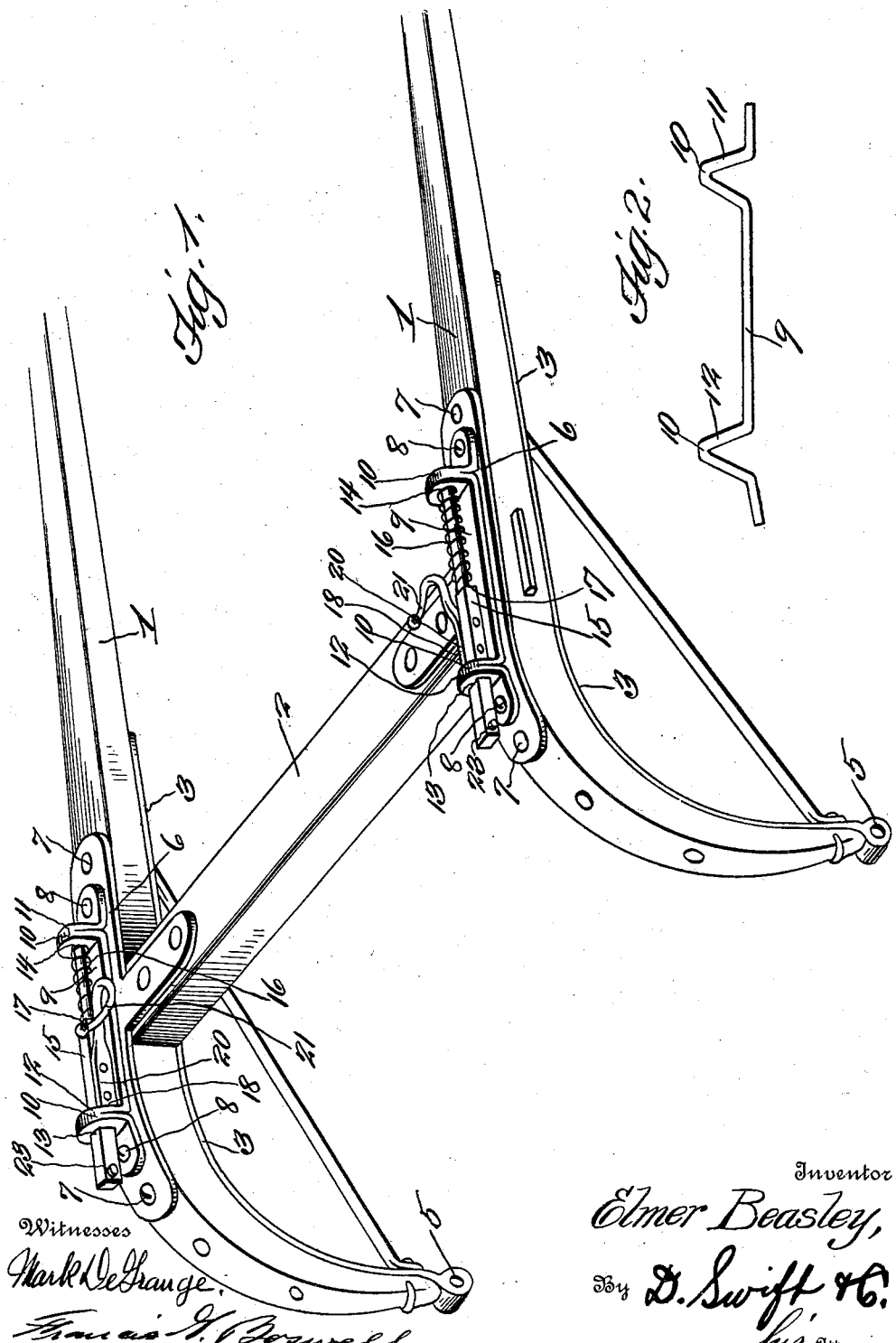

ELMER BEASLEY, OF CARTERVILLE, ILLINOIS.

TRACE CONNECTION FOR VEHICLE-SHAFTS.

1,068,962.          Specification of Letters Patent.          Patented July 29, 1913.

Application filed March 1, 1913. Serial No. 751,506.

*To all whom it may concern:*

Be it known that I, ELMER BEASLEY, a citizen of the United States, residing at Carterville, in the county of Williamson and State of Illinois, have invented a new and useful Trace Connection for Vehicle-Shafts; and I do hereby declare the following to be a full, clear, and exact description of the invention, such as will enable others skilled in the art to which it appertains to make and use the same.

This invention relates to a new and useful trace connection for vehicle shafts.

As one of the objects of the invention, it is the aim to provide an improved connection of this nature, whereby the traces may be connected to the shafts yieldably.

One of the features of the invention is the provision of a base plate bolted or otherwise secured to the shafts, and having a second plate bent upon itself forming a pair of lugs, in openings of which a rod is guided, to which the trace is connected, there being a coil spring interposed between a shoulder on the rod and one of the lugs, to afford a yielding connection between the trace and the shafts.

In practical fields the details of construction may necessitate alterations, to which the patentee has a right, provided the alterations fall within the scope of what is claimed.

The invention comprises further features and combination of parts, as hereinafter set forth, shown in the drawings and claimed.

In the drawings:—Figure 1 is a view in perspective, showing the application of the improved trace connection. Fig. 2 is a detail view of one of the plates 9, showing the same partly bent to form the upwardly extending lugs.

Referring more especially to the drawings, 1 designates the shafts having the cross rail 2 and the bracing face plates 3, bracing and fitting the rear curvature of each shaft pole. One end of each face plate terminates in an eye 5 to receive the pin (not shown) of the thill-coupling (not shown). Secured upon each pole of the shafts is a base plate 6, fixed in position by the bolts 7. Riveted or otherwise fastened at 8 to each base plate is a second plate 9. The plates 9 are bent upon themselves, each in two places, as indicated at 10 to form the lugs 11 and 12. Each lug 12 is provided with a rectangular guide opening 13, while each lug 11 is formed with a circular guide opening 14.

A pair of rods 15 is provided. One end of each rod is constructed rectangular in cross section, and is adapted to operate in each rectangular opening 13, while the other end of each rod is cylindrical, and operates through the cylindrical opening 14, there being a coil spring 16 interposed between the lug 11 and the shoulder 17 of each rod, for holding the end 18 of the plate 20 against the lug 12. The plate 20 is riveted or otherwise secured to the rod, and the end 18 forms a shoulder, which engages the lug 12. Each plate 20 terminates in a hook 21, to which a trace (not shown) may be connected. From the foregoing in conjunction with the accompanying drawings, it will be seen that as the animal pulls forward on the traces, the springs are compressed, thereby relieving the animal of the sudden jar or strain from his shoulders. When the animal pulls forward and compresses the springs, the said rods are limited in their forward movements, by the transverse pins 23 coming in contact with the lugs 12.

The invention having been set forth, what is claimed as new and useful is:—

1. In combination, a base plate to be secured to a shaft pole, a second plate bent upon itself in two places with the parts adjacent the bent portions welded together forming upstanding lugs, said lugs having guide openings, a rod guided in said openings provided with a shoulder, a coil spring interposed between the shoulder and one of the lugs, a plate carried by the rod and terminating in a hook adapted to engage a trace, said plate forming an abutment shoulder to limit the rod in one direction, and means extending transversely of one end of the rod to engage one of the lugs to limit the rod in its movement in the other direction.

2. In combination, a base plate to be secured to a shaft pole, a second plate provided with upstanding lugs, one of said lugs having a rectangular guide opening, while the other lug is provided with a circular guide opening, a rod, one portion of which is rectangular to operate through the rectangular guide opening, while the other portion of said rod is cylindrical to operate through the circular opening, said rectangular portion of the rod forming a shoulder, a coil spring interposed between said shoulder and one of the lugs, a plate carried by the rod and terminating at one end in a hook to be engaged by a trace, said plate forming an abutment shoulder to limit the rod in its movement in one direction, and a pin extending transversely of the rectangular portion of said rod to contact with one of the lugs to limit the rod in its movement in the other direction.

In testimony whereof I have signed my name to this specification in the presence of two subscribing witnesses.

ELMER BEASLEY.

Witnesses:
W. J. WALKER,
L. H. CROWDER.

---

Copies of this patent may be obtained for five cents each, by addressing the "Commissioner of Patents, Washington, D. C."